United States Patent [15] 3,704,903
Ito [45] Dec. 5, 1972

[54] SOCKET MOUNTING STRUCTURE OF BALL-AND-SOCKET JOINT USED FOR COUPLING LINK MEMBERS FOR DRIVING A WINDSHIELD WIPER FOR VEHICLES

[72] Inventor: Isao Ito, Handa, Japan

[73] Assignee: Nippondenso Kabushiki Kaisha, Aichi-ken, Japan

[22] Filed: April 8, 1971

[21] Appl. No.: 132,506

[30] Foreign Application Priority Data

April 10, 1970 Japan .............................. 45/35082

[52] U.S. Cl. ............................................. 287/90 R
[51] Int. Cl. .............................................. F16c 11/06
[58] Field of Search ............ 287/88, 87, 90 R, 90 C; 264/274

[56] References Cited

UNITED STATES PATENTS 3,491,441  1/1970  Belsaas .............................. 264/274
2,891,362  6/1959  Bettridge ........................... 174/525

FOREIGN PATENTS OR APPLICATIONS 217,804  10/1958  Australia ........................... 287/90 R Primary Examiner—Andrew V. Kundrat
Attorney—Cushman, Darby & Cushman

[57] ABSTRACT

An improved socket mounting structure of a link member in a ball-and-socket joint used for coupling link members for driving a windshield wiper for vehicles. An integral annular projection is formed along the peripheral edge of a socket mounting hole formed in the link member, and the socket is mounted in said mounting hole concurrently with molding of said socket and tightly secured therein by said annular projection.

1 Claim, 7 Drawing Figures

PATENTED DEC 5 1972 3,704,903
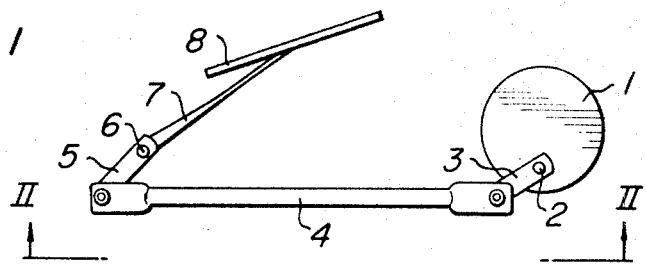
FIG. 1
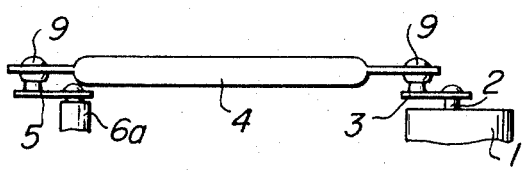
FIG. 2
FIG. 4 PRIOR ART
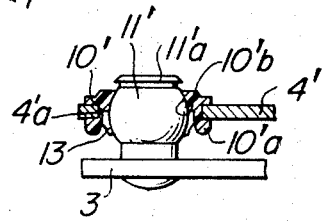
FIG. 3 PRIOR ART
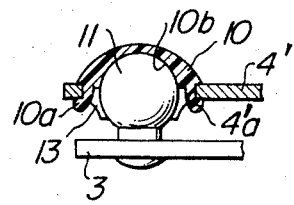
FIG. 6 PRIOR ART
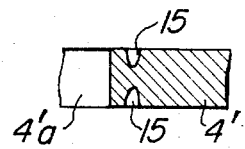
FIG. 5 PRIOR ART
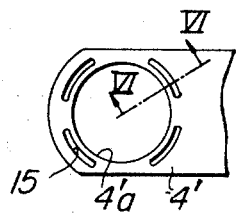
FIG. 7
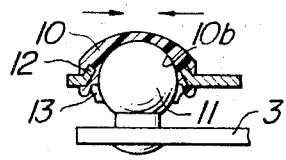
INVENTOR
Isao ITO
BY
Cushman, Darby &
Cushman   ATTORNEYS

SOCKET MOUNTING STRUCTURE OF BALL-AND-SOCKET JOINT USED FOR COUPLING LINK MEMBERS FOR DRIVING A WINDSHIELD WIPER FOR VEHICLES

This invention relates to an improved structure of the ball-and-socket joint for use in coupling link members in a driving mechanism for driving windshield for vehicles.

Prior art ball-and-socket joints of the type described include one disclosed, for example, in French Pat. No. 1,185,952. This prior art ball-and-socket joint comprises a ball and a socket which is made of an artificial resin, such as polyamide, and formed with a recess for receiving said ball, said socket being mounted in a hole formed in a link member connected to the crank arm of a wiper motor, and having an integral collar-like section extending from the peripheral edge of said recess and having a plurality of slits formed therein over the entire circumference thereof so as to facilitate the insertion of the ball into said recess.

Another prior art ball-and-socket joint is disclosed in British Pat. No. 885,198. This prior art joint comprises a ball having an annular projecting shoulder of a larger diameter formed at the free end thereof and a socket made of an artificial resin material similar to that in the above-described prior art joint and having a through-hole for receiving said ball, whereby the separation of the ball from the socket is prevented by the engagement between said annular projecting shoulder and the peripheral edge of said through-hole even when a force is applied to the ball in the direction to separate it from the socket during operation of the wiper. In either prior art joint, the socket is mounted in the hole of the link member concurrently with molding.

However, any of these prior art joints had the disadvantage that, since a relatively large hole must be formed in the link member at the location where the socket is to be mounted, the strength of that portion of the link member is substantially reduced due to the presence of the hole and the link member tends to be deformed or broken at said portion during operation of the wiper, under the driving force acting on the link member. In order to eliminate such fatal drawback, it has been conventional to make the width of the link member larger than actually required, which has necessitated uneconomical use of the material for the link member. An additional disadvantage of these prior art joints is that, since the socket is mainly made of the resin material, it shrinks largely during cooling after it has been molded in the hole of the link member, so that a tight connection between the socket and the link member cannot be obtained due to a gap formed therebetween. Consequently, the noise becomes large during operation of the wiper or the working angle of the wiper varies largely incident to a change in frictional resistance between the glass surface and the wiper blade. As such, the prior art joints had a number of practical disadvantages. In order to overcome these disadvantages, it has been practiced to form circumferentially discontinuous arcuate grooves on each side of the link member around the peripheral edge of the socket mounting hole, so as to restrict the shrinkage of the socket to a minimum extent by the molding material penetrating into said grooves, or to fill the gap with an adhesive so as to provide rigid connection between the socket and the link member. These methods, however, are unsatisfactory because the former method adds to the number of steps involved in the fabrication of the link member and the latter method requires an additional time for adhesively bonding the socket with the link member.

In order to solve a number of problems set forth above, the present invention has for its object the provision of an economical, rattling-free highly practical ball-and-socket joint, wherein an annular projection is formed along the peripheral edge of a socket mounting hole formed in the link member, whereby the width of the portion of the link member remaining after formation of the hole is substantially increased and it becomes possible to use a strip of narrow width for the link member, to restrict the shrinkage of the socket to a minimum extent by the engagement between it and said annular projection and to connect the socket rigidly integrally with said link member.

According to the present invention there is provided a socket mounting structure of a link member in a ball-and-socket joint used for coupling link members for driving a windshield wiper for vehicles, said ball-and-socket joint comprising a ball fixedly mounted on one of said link members and a synthetic resin-made socket mounted in the other link member and having a recess for receiving said ball; wherein an annular projection is formed along the peripheral edge of a socket mounting hole formed in said other link member and said socket is mounted in said socket mounting hole concurrently when it is molded and tightly secured therein by the engagement between it and said annular projection.

Since the annular projection is formed along the peripheral edge of the socket mounting hole in the link member and the socket of the ball-and-socket joint is mounted in said hole concurrently when it is molded and secured to said link member by said annular projection, the socket mounting structure according to the invention has the advantages that the shrinkage of the socket during cooling subsequent to molding can be prevented by the annular projection and hence rattling of the socket can be eliminated. A further advantage of the invention is that, even if the width of the link member is the same as that of the conventional one, the width of the portion of said link member remaining after formation of the socket mounting hole is substantially larger than that of the latter, so that the modulus of section and hence the strength of said portion of the link member can be substantially increased as compared with the conventional one. This enables a strip of narrow width to be used for the link member and hence the material of the link member can be used economically.

The above and other objects and advantages of the invention will become apparent from the following description with reference to the accompanying drawings in which same reference numerals indicate same or similar parts. In the drawings;

FIG. 1 is a schematic front view exemplifying the driving device for driving a windshield wiper for vehicles;

FIG. 2 is a side view of the driving device looking in the direction of II—II;

FIG. 3 and 4 are cross-sectional views respectively showing, in an enlarged scale, the constructions of two prior art ball-and-socket joints used in the driving device;

FIG. 5 is a front view showing the structure of the conventional link member used in the devices of FIGS. 3 and 4;

FIG. 6 is an enlarged cross-sectional view taken on the line VI—VI of FIG. 5; and FIG. 7 is a cross-sectional view showing the structure of the link member according to the present invention, with the socket of a ball-and-socket joint mounted therein.

In the device shown in FIGS. 1 and 2, a crank arm 3 is mounted on a spindle 2 which is driven by a wiper motor 1. The crank arm 3 is connected to one end of a link member 4 through a ball-and-socket joint 9 to be described later. The other end of the link member 4 is connected to a link lever 5 through another ball-and-socket joint 9. The rotational motion of the wiper motor 1 is converted into a rocking motion by the link mechanism described above, and transmitted to a pivot pin 6 mounted on a pivot holder 6a, to drive a wiper arm 7 fixed to said pin 6. Reference numeral 8 designates a wiper blade which is driven by the arm 7 to wipe the glass surface.

The prior art ball-and-socket joint disclosed in French Pat. No. 1,185,952 mentioned above has a construction as shown in FIG. 3, and a socket 10 made of a synthetic resin material, such as polyamide, is mounted in a hole 4'a formed at each end a link member 4' and secured therein by a radial projection 10a engaging the peripheral edge of said hole. Reference numeral 13 designates a collar-like section having a plurality of slits formed therein.

The prior art ball-and-socket joint disclosed in British Pat. No. 885,198 mentioned above has a structure as shown in FIG. 4. Namely, a ball 11' has an annular projecting shoulder 11'a formed at the free end thereof. A socket 10' molded of a material similar to that of the socket of the preceding prior art joint, is formed with a through-hole 10'b for receiving the ball 11'. During operation of the wiper, the separation of the ball 11' from the socket 10'b can be prevented by the engagement between the annular projecting shoulder 11'a and the peripheral edge of the hole 10'b.

This prior art joint has the disadvantage as described previously because a relatively large hole as indicated by 4'a must be formed in the link member 4' at the location where the socket 10 or 10' is to be mounted.

In FIGS. 5 and 6 is shown the structure of the other prior art joint, in which, in order to obviate the disadvantage of the preceding prior art joint, circumferentially discontinuous arcuate grooves 15 are formed on each side of the link member for the penetration of the molding material thereinto during molding of the socket 10 or 10'. This structure has the disadvantage that the steps involved in the fabrication of the link member or the time required for obtaining a rigid connection between the socket and link member increases as stated previously.

Now, the ball-and-socket joint 9 according to the instant invention will be described in detail with reference to FIG. 7. As shown, the link member 4 has an annular projection 12 formed by punching along the peripheral edge of a socket mounting hole formed in said link member at the location where the socket 10 is to be mounted, said socket 10 being molded of a synthetic resin material, such as polyamide, polyacetal or polyurethane. In molding the socket, the link member 4 is inserted into the shaping mold so that the socket is mounted in said hole concurrently when it is molded. After molding, the shrinkage of the socket 10 in the directions of the arrows during cooling, is prevented by the engagement between the projection 12 and the socket 10. Further, by forming the projection 12 along the peripheral edge of the socket mounting hole, the width of the portion of said link member remaining after formation of the hole can be made larger than in the case of a flat link member used heretofore, even when the width of said link member is equal to that of the latter. Furthermore, by shaping the link member as described above, the modulus of section and hence the strength of that portion of the link member can be substantially increased. Thus, a sufficient strength can be obtained even when a strip of narrow width is used for the link member. Reference numerals 10b, 11 and 13 designate a ball receiving recess, a ball and a collar-like section respectively which are the same as those of the prior art joints.

Although the present invention has been described herein with reference to the structure obtained by improving the structure of FIG. 3 according to the invention, the same improvement can similarly be made to the structure of the ball-and-socket joint shown in FIG. 4.

What is claimed is:

1. A ball-and-socket joint, comprising:
   a first link member having a ball fixedly mounted thereon;
   a second link member; means defining a transverse opening through the second link member; said link member in an annular band perimetrally of the opening extending obliquely to provide a generally frustoconical annular flange extending from said opening;
   a synthetic resin socket member disposed within the opening and securely engaging two opposite sides of the second link member, both upon said flange and radially outwardly beyond the base of said flange, said socket member being molded in place to effect the recited engagement; means defining a ball receiving socket in said socket member generally centered upon the longitudinal axis of the opening on the side of the second link member from which the annular flange appears to be a depression, the ball being received in the socket and thus lying disposed within the said transverse opening prior to forming said flange thereon having a diameter substantially equal to the diameter of said ball so as to provide a wider remaining portion of said second link member.

* * * * *